United States Patent [19]

Molzon

[11] 3,971,455

[45] July 27, 1976

[54] DOUBLE DECK BUS

[75] Inventor: William R. Molzon, Rancho Palos Verdes, Calif.

[73] Assignee: Rohr Industries, Inc., Chula Vista, Calif.

[22] Filed: Sept. 17, 1975

[21] Appl. No.: 614,341

[52] U.S. Cl. ............................ 180/89 R; 296/28 AB
[51] Int. Cl.² ..................... B60J 9/02; B62D 31/04
[58] Field of Search .............. 180/89 R; 296/28 AB, 296/28 A, 37

[56] References Cited
UNITED STATES PATENTS

| | | | |
|---|---|---|---|
| 1,102,602 | 7/1914 | Mitten | 296/28 AB |
| 1,468,710 | 9/1923 | Leindorf | 296/28 AB |
| 1,588,906 | 6/1926 | Rackham | 296/28 AB |
| 2,173,727 | 9/1939 | Ramstrum | 296/37 R X |
| 2,430,324 | 11/1947 | Bartholomew | 296/28 AB |
| 3,029,102 | 4/1962 | Mueller | 296/28 AB |

FOREIGN PATENTS OR APPLICATIONS

| | | | |
|---|---|---|---|
| 615,280 | 1/1961 | Italy | 296/28 AB |
| 217,108 | 1/1942 | Switzerland | 296/28 AB |
| 291,677 | 6/1928 | United Kingdom | 296/28 AB |
| 928,649 | 6/1963 | United Kingdom | 296/28 AB |

Primary Examiner—Kenneth H. Betts
Attorney, Agent, or Firm—Patrick J. Schlesinger

[57] ABSTRACT

A double deck bus has a wide front entrance door and two rear exit doors, one from each deck. The upper deck is at selected standing headroom height from the lower deck, and at selected sitting headroom height from the vehicle roof. A channel passageway with selected standing headroom is provided lengthwise of the upper deck. A curved front stairway leads from the front entrance door to the front end of the upper deck passageway, and a descending stairway leads from the rear end of said passageway to one of the rear exit doors. The fare box is located within the curve of the front stairway to be visible to the driver, whose seat is well above the lower deck. An engine compartment is provided at the rear end of the bus, and a wall separates it from the lower deck passenger compartment. A passageway also is provided along the lower deck from the area of the fare box to the other rear exit door, and is offset laterally from the upper deck passageway so as to provide selected, standing headroom throughout its length.

9 Claims, 4 Drawing Figures

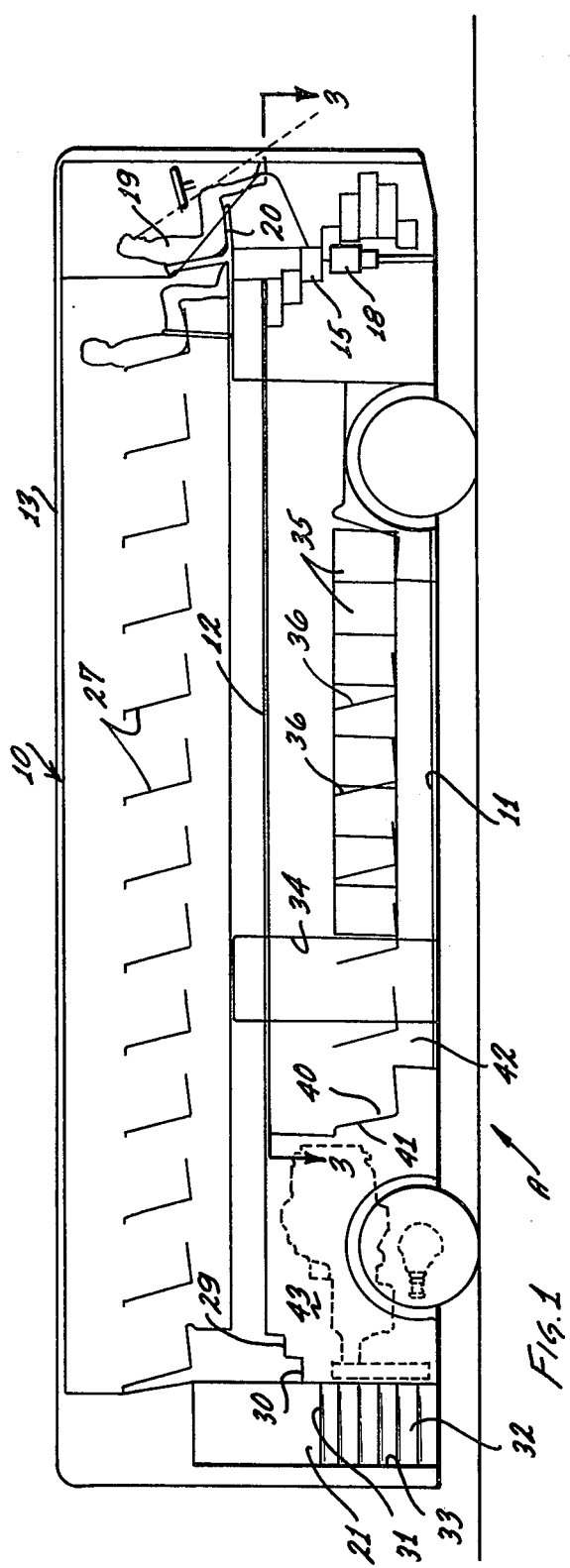
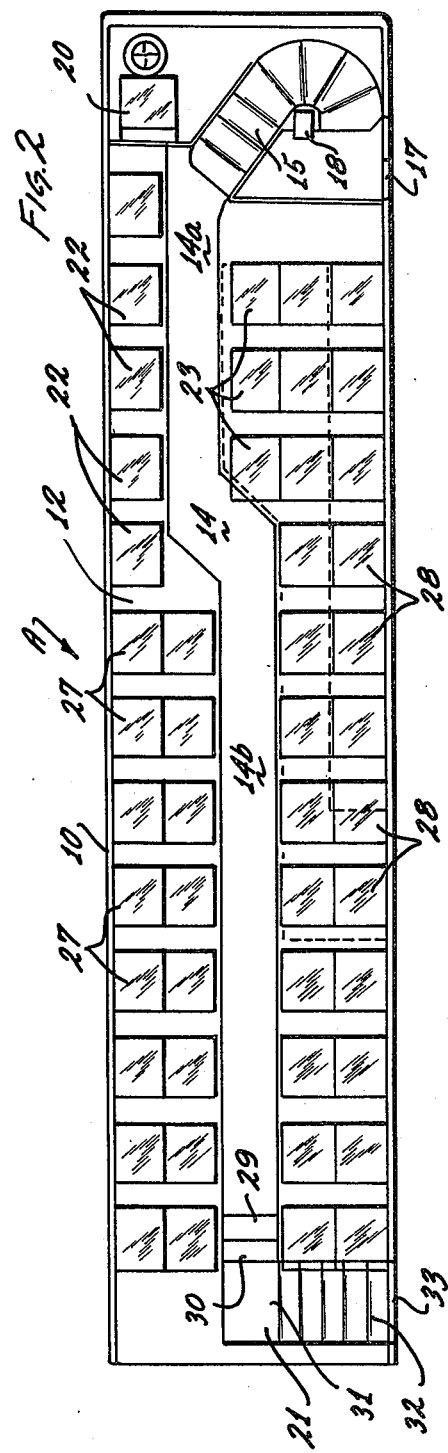

DOUBLE DECK BUS

BACKGROUND OF THE INVENTION

It has long been recognized that a double deck bus would have certain advantages over a single deck bus, one of the principal advantages being the substantial increase in seating capacity of such a bus. However, when a double deck bus is designed with full headroom throughout both decks, the vehicle is apt to be top heavy, and of a height which prevents it from operating on certain routes with low overhead clearance.

It is not broadly new to provide a double deck bus with less than full standing headroom on the upper deck, and with a recessed or channel passageway extending lengthwise of the upper deck, said passageway being of a depth to provide full standing headroom therein, as shown, for example, in U.S. Pat. Nos. 3,029,102 and 2,173,727. None of the known prior patents, however, either disclose or suggest any of several novel features of the present invention, which features include: the driver's elevated location with ability to monitor the fare box with passengers boarding through a single entrance and going to both the upper and lower decks; the easy, rearward flow-through of traffic along the laterally offset passageways of both decks, with separate exits for the passengers of each deck, and the equalized weight distribution with a loaded bus.

SUMMARY OF THE INVENTION

The present invention provides a double deck bus having the upper deck spaced from the lower deck to provide selected, standing headroom on the lower deck, and from the roof to provide selected sitting headroom only on the upper deck. An upwardly open channel passageway extends lengthwise of the upper deck, the front end of such passageway opening onto the upper end of a curved front stairway ascending from the lower deck, and the rear end thereof opening onto the upper end of a rear stairway descending to an exit door at the rear end of the bus.

A wide front entrance door is provided adjacent the lower end of the front, curved stairway, and the fare box is located in the curve of this stairway for monitoring by the driver of the bus, whose seat is elevated above the lower deck. A passageway also is provided along the lower deck of the bus, and is offset laterally from the channel passageway of the upper deck. This lower deck passageway terminates at its rear end adjacent a second rear exit door.

A propulsion engine and mechanical accessories, including air conditioning equipment, are mounted in an engine compartment provided rearwardly of the lower deck passenger compartment, and is sealed from the passenger compartment by a wall. Thus, the passengers for both decks enter at a single, wide, front entrance door, and, in passing the fare box, drop their fares therein under the monitoring eye of the elevated driver, and move rearwardly along the passageways of both decks with standing headroom. All of the seats of both decks are easily accessible from their respective passageways, and provide full sitting headroom for all passengers seated therein.

In exiting, the passengers, after leaving their seats, continue their rearward movement along their respective passageways to the separate exits provided, one for each of the decks. The termination of the lower deck passenger compartment ahead of the engine compartment tends to equalize the total loaded weight of the bus on both front and rear wheels, and thus allows the use of only four so-called super single tires without exceeding the usual legislated maximum loading of 18,000 lbs. per axle. The arrangement further orients both stairways in such a manner that neither is rearwardly ascending, in which latter case a passenger standing on the stairs would tend to fall down the stairs in the event of a sudden stop. On the other hand, both stairways of the present invention are so arranged that in the event of a sudden stop, passengers on either stairway would tend to fall either into the stairs themselves, or against the side assist handrails.

BRIEF DESCRIPTION OF THE DRAWINGS

The objectives and advantages of the invention will be apparent from the following description and the accompanying drawings, wherein:

FIG. 1 is a diagrammatic, side elevational view of a bus embodying the invention.

FIG. 2 is a diagrammatic, sectional view taken along line 2—2 of FIG. 1.

DETAILED DESCRIPTION OF THE ILLUSTRATIVE EMBODIMENT OF THE INVENTION

Figure 3:
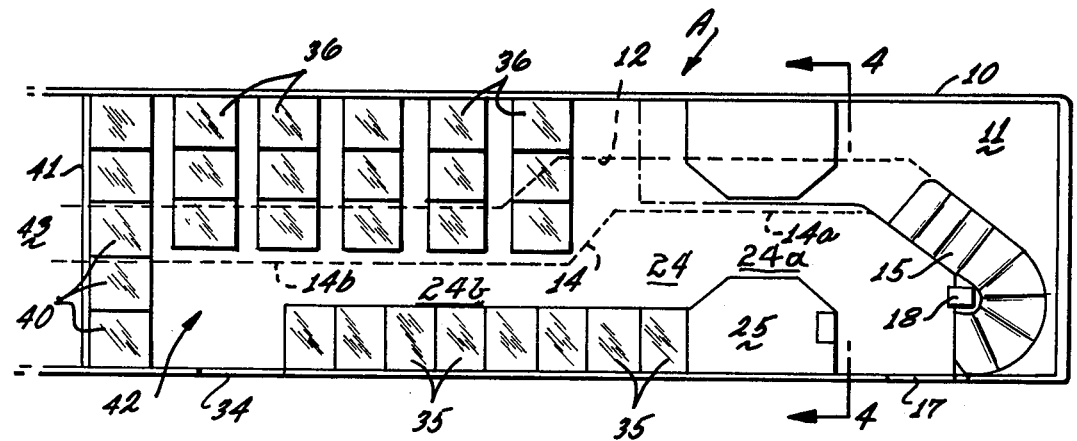
FIG. 3 is a fragmentary, diagrammatic, sectional view taken along line 3—3 of FIG. 1, terminating at the rear wall of the passenger compartment.
Figure 4:
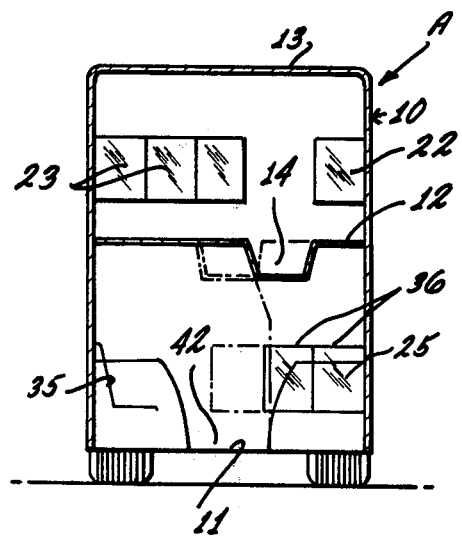
FIG. 4 is a vertical, transverse, sectional view taken along line 4—4 of FIG. 1.

Referring to the drawings in detail, a bus A embodying the invention has a body 10 of suitable or conventional construction with flat lower deck 11 and an upper deck 12 at selected, standing headroom height from the lower deck, which height, for the purpose of the present disclosure, is assumed to be 73 inches. The upper deck 12 is spaced at selected sitting headroom height from the vehicle roof 13, which latter height is assumed to be 48 inches.

An upwardly open channel passageway 14 is provided lengthwise of the upper deck 12, said channel being of suitable width for a passageway, for example, 23 inches, and of a depth to provide selected standing headroom throughout its length, which height, as in the case of the lower deck, is assumed to be 73 inches.

A forward portion 14a of this channel passageway is offset toward the left hand side of the bus, and leads from the upper end of a curved front stairway 15, which ascends from the lower deck 11 at a point adjacent a double width front entrance door 17. A fare box 18 is mounted within the curve of the lower end of the front stairway 15 at a height to be accessible to both lower and upper deck passengers entering through the door 17, and to be visible for monitoring by the bus driver 19, whose seat 20, see FIG. 1, is mounted at a selected elevation, which, as shown in FIG. 1, is approximately level with the upper deck 12.

A rearward portion 14b of the channel passageway 14 is located substantially centrally of the bus, and leads to the upper end of a rear stairway 21. A row of single seats 22, see FIG. 2, is provided along the left hand side of the passageway portion 14a, looking forward, while three-wide seats 23 are provided along the right hand side of this portion 14a of the passageway. This arrangement provides for an easy curve for the front stairway 15, as well as providing lateral clearance from an offset forward portion of a lower deck passageway, as will be apparent later herein.

The centrally located rear portion 14b of the upper deck channel passageway 14 has double seats 27 and 28 on opposite sides thereof. The two top steps 29 and 30 of the rear stairway 21 lead to a landing 31, from which the remaining steps 32 descend to the lower deck level and to an exit door 33 at the rear end of the bus.

The forward portion 24a of a lower deck passageway 24 is offset to extend alongside the right hand front wheel well 25, while the rearward portion 24b of this passage is offset toward the right hand side of the bus to clear the upper deck passageway 14, which is indicated in broken lines in FIG. 3, and leads to a second rear exit door 34. A row of side facing, single seats 35 are provided along the right hand side of the lower deck passageway portion 24b, while triple seats 36 are provided along the left hand side thereof.

A row of seats 40 also extends transversely across the rear end of the lower deck passenger compartment just forwardly of an insulated wall 41, which separates the lower deck passenger compartment 42 from an engine compartment 43 provided rearwardly thereof.

OPERATION OF THE ILLUSTRATIVE FORM OF THE INVENTION

Assuming that the bus A as illustrated and described herein stops at a curb to load and discharge passengers. The driver 19 stops the bus and opens all three doors 17, 33 and 34 by means of suitable or conventional door actuating mechanism, not shown. Boarding passengers enter through the wide front entrance door 17, two abreast, if necessary, those going to the upper deck turning to the right and climbing the front stairway 15 while depositing their fares in the fare box 18, and those going to the lower deck similarly depositing their fares and moving rearwardly along the passageway 24. The driver 19, from his elevated vantage point, monitors the deposit of fares by all incoming passengers. When a passenger comes to a selected seat, he moves into the footroom area of the seat and sits down, all of the seats on both decks having at least full sitting headroom.

Passengers leaving the bus from either deck pass from their seats into their respective passageways, and then move rearwardly therealong, those from the lower floor exiting through the door 34, while those from the upper deck descend the rear stairway 21 and exit through the door 33.

When all of the passengers desiring to do so have either entered or left the bus, the driver closes the doors 17, 33 and 34, and proceeds on his way.

A bus embodying the present invention can be built at a cost not greatly exceeding that of a single deck bus of corresponding length and width, but will accommodate a much greater pay load. Also, when loaded, the present bus has its load distributed substantially evenly between the front and rear wheel axles. Provision of the channel passageway in the upper deck is a strengthening factor, and permits the use of a sandwich type upper deck construction with structural foam core and thin aluminum top and bottom surface sheets which provide adequate strength with a slab only 1 inch in thickness. A roof structure of similar thickness may also be employed, while the lower deck preferably has a thickness of 2 or 3 inches.

The overall height of such a bus, assuming the dimensions set forth herein, and with a ground clearance for the lower deck of 14 inches, will be only 11 feet 6 inches high. In the event that an additional 6 inches of headroom is required for both the lower and the upper decks, such additional headroom can be provided with an overall height of only 12 feet 6 inches, which still would be usable on a very large proportion of existing bus service routes in the United States. Furthermore, this low overall height would provide a bus with adequate stability.

Having thus described the invention, what is claimed as new and useful and desired to be secured by United States Letters Patent is:

1. A double deck bus having a body with a front entrance and two rear exits, said bus comprising:
    a lower deck terminating short of the rear end of the body,
    an upper deck extending substantially the full length of the body and spaced vertically from the lower deck by selected standing head room height, the upper deck being spaced vertically from the roof of the body by selected sitting head room height,
    an engine compartment rearwardly of the lower deck,
    a sealed wall separating the engine compartment from the interior of the body between the decks,
    an upwardly opening channel passageway formed in, and extending lengthwise of, the upper deck, the bottom of the channel passageway being spaced from the roof by selected standing headroom height,
    a curved stairway ascending from an area adjacent the front entrance with its upper end opening into a forward portion of the channel passageway,
    a fare box mounted within the curve of the front stairway for access by persons entering the front entrance and going to both the upper and lower decks,
    a driver's seat elevated above the lower deck at a height, and so located, as to provide for monitoring of the fare box by a driver seated in the driver's seat,
    a second stairway descending from the rear end of the channel passageway to one of the rear exits, and
    a passageway along the lower deck, said lower deck passageway being offset laterally from the upper deck channel passageway, and extending from an area adjacent the fare box to the other rear exit.

2. A double deck bus as claimed in claim 1 wherein the curved stairway describes a curve of substantially less than 180°.

3. A double deck bus as claimed in claim 2 wherein the lower part of the curved front stairway ascends forwardly, and the upper part thereof ascends obliquely rearwardly.

4. A double deck bus as claimed in claim 1 wherein the entrance and at least one of the exits are on one side of the bus, and the lower deck passageway is offset laterally from the upper deck channel passageway toward said one side of the bus.

5. A double deck bus as claimed in claim 1 wherein a forward portion of the upper deck channel passageway is offset laterally from the longitudinal center line of the bus toward the other side of the bus from that having the entrance therein, and the rear portion of said channel passageway is located substantially centrally of the bus body.

6. A double deck bus as claimed in claim 5 wherein the lower deck passageway conforms substantially throughout the reduced length of the lower deck to the corresponding portion of the upper deck passageway, and, in plan, is laterally closely adjacent thereto.

7. A double deck bus as claimed in claim 1 wherein the driver's seat is at an elevation approximating that of the upper deck.

8. A double deck bus as claimed in claim 1 wherein the forward portion of the lower deck passageway is laterally adjacent the front wheel well on the entrance side of the bus.

9. A double deck bus as claimed in claim 8 wherein the rear portion of the lower deck passageway aft of the front wheel wells has a lateral offset therein toward the entrance side of the bus, and extends thence substantially straight and parallel to the entrance side of the bus to the area laterally inwardly of the lower deck exit.

* * * * *